United States Patent [19]
Ganiaris

[11] 3,794,099
[45] Feb. 26, 1974

[54] FLUIDIZED BED PROCESS FOR DRYING AMMONIUM SULPHATE

[76] Inventor: Neophytos Ganiaris, 3671 Hudson Manor Terr., Riverdale, N.Y. 10463

[22] Filed: June 14, 1971

[21] Appl. No.: 152,887

[30] Foreign Application Priority Data
June 13, 1970 Great Britain.................. 28721/70

[52] U.S. Cl............ 159/48 R, 423/545, 159/DIG. 3
[51] Int. Cl........................... B01d 1/16, F26b 3/12
[58] Field of Search...... 159/DIG. 3, 48 R; 423/545; 117/100 A

[56] References Cited
UNITED STATES PATENTS

| | | | |
|---|---|---|---|
| 2,805,125 | 9/1957 | Van Ackeren | 23/302 |
| 2,895,800 | 7/1959 | Otto | 23/302 |
| 2,739,039 | 3/1956 | Phelps | 23/129 |
| 2,795,487 | 6/1957 | Otto | 23/273 L |
| 3,152,005 | 10/1964 | Tuttle | 117/100 |
| 3,251,428 | 5/1966 | Tabler | 117/100 |
| 3,322,492 | 5/1967 | Flood | 23/46 |
| 3,346,333 | 10/1967 | Nadler | 23/91 |
| 3,578,396 | 5/1971 | Priestley | 162/30 |
| 2,789,034 | 4/1957 | Swaine et al. | 23/177 |

*Primary Examiner*—Jack Sofer

[57] ABSTRACT

A nozzle introducing a spray into a fluidized bed is positioned a few inches below the top of the expanded bed to minimize the production of dust and to reduce the formation of lumps of material on the surfaces of the nozzle.

1 Claim, 3 Drawing Figures

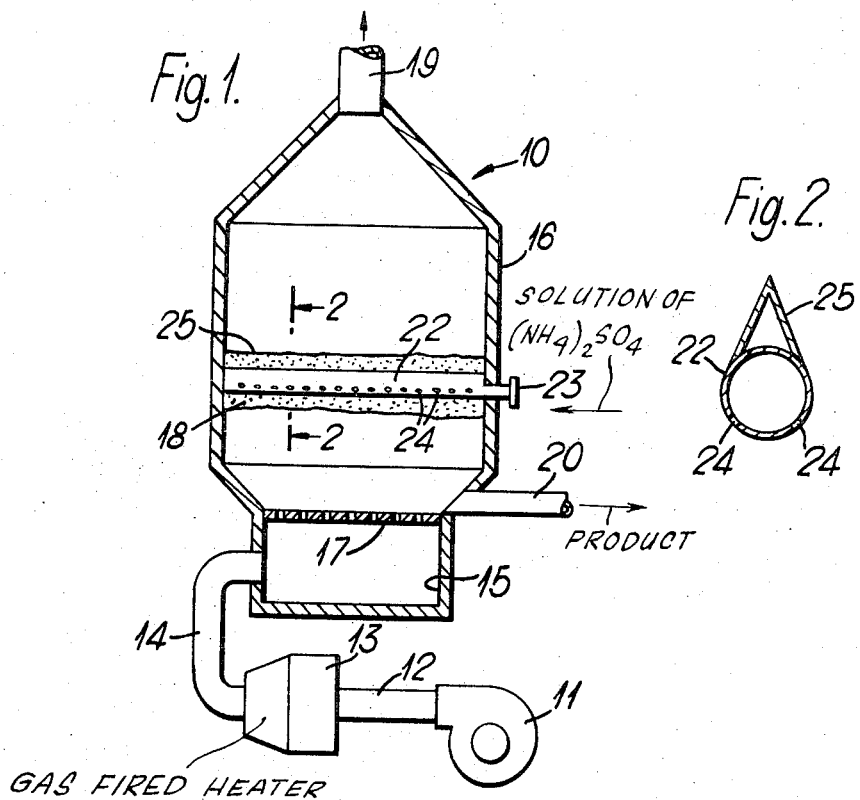
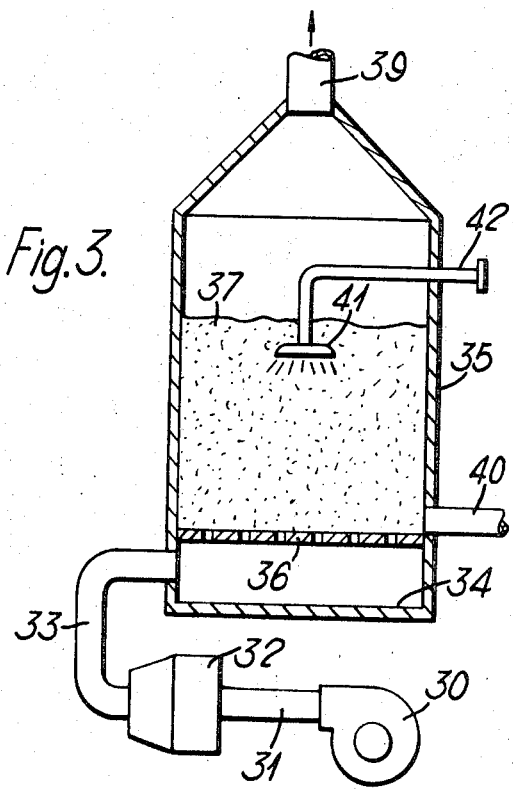

FLUIDIZED BED PROCESS FOR DRYING AMMONIUM SULPHATE

BRIEF DESCRIPTION OF THE DRAWING

FIG. 1 is a longitudinal, vertical section through a fluidized bed apparatus showing a pipe nozzle positioned within the expanded bed;

FIG. 2 is a section taken on line 2—2 of FIG. 1; and

FIG. 3 is a longitudinal, vertical section through a fluidized bed apparatus showing a conventional spray nozzle positioned below the top of the fluidized bed.

DESCRIPTION OF THE PREFERRED EMBODIMENTS

As shown in FIGS. 1 and 2, a first fluid bed apparatus 10 has a blower 11 which passes air through duct 12 to a gas fired heater 13. Hot gases pass through duct 14 from heater 13 to the plenum chamber 15 in the base of the fluidized bed container 16. The hot gases pass upwards through the perforated plate 17 to form the fluidized bed 18. Hot gases leave through duct 19 and a product is withdrawn through pipe 20.

If the apparatus is a granulator, nozzle 22 has a solution introduced into it through fitting 23 to spray into the bed 18 through the apertures 24. Nozzle 22 may have a peaked or pointed cover 25 fixed over it.

The placing of nozzle 22 within bed 18 has two main advantages. First, the solution sprayed from nozzle 22 directly enters bed 18 so that it cannot escape without coating the fluidized particles of the bed. When the solution is sprayed from above the bed as in conventional practice, water may evaporate from some small droplets before they can aggregate with fluidized particles so that the droplets become dust which is carried out duct 19. This may require the costly collection of quantities of dust which then must be recycled or wasted.

Second, many materials being granulated will lump or stick and build up on any surfaces that are provided. By locating the nozzle 22 within the bed, the violently moving fluidized particles of the bed will constantly impinge on the nozzle 22 and dislodge any particles sticking to it to prevent the buildup of large lumps which could clog the product exit pipe 20.

FIG. 3 shows a blower 30 passing air through duct 31 to a gas fired heater 32. Hot gases from heater 32 pass through duct 33 to the base 34 of the fluidized bed container 35. The hot gases pass upwards through a perforated plate 36 to form the fluidized bed 37 in container 35. Gases leave container 35 through duct 39 and product is withdrawn through pipe 40. Nozzle 41 may be any conventional spray device fixed at the end of pipe 42 through which solution is introduced. As has been stated, this location of nozzle 41 reduces the production of dust or fines and prevents the formation of lumps on the surfaces of nozzle 41. This invention has been used successfully in the granulation of a 42 to 48 per cent solution of ammonium sulfate to form solid particles or pellets of a desired size.

What is claimed is:

1. In a process of introducing a feed of 42 to 48 percent solution of ammonium sulfate into a fluidized bed, the step of injecting the feed as a plurality of downwardly directed jets extending along an entire diameter of the bed and submerged in the bed below the upper surface of the bed; wherein the bed granulates the solution into solid particles and is fluidized by an upwardly directed flow of hot air and combustion products as a drying gas extending across the entire bottom of the bed.

* * * * *